United States Patent Office 3,264,603
Patented August 2, 1966

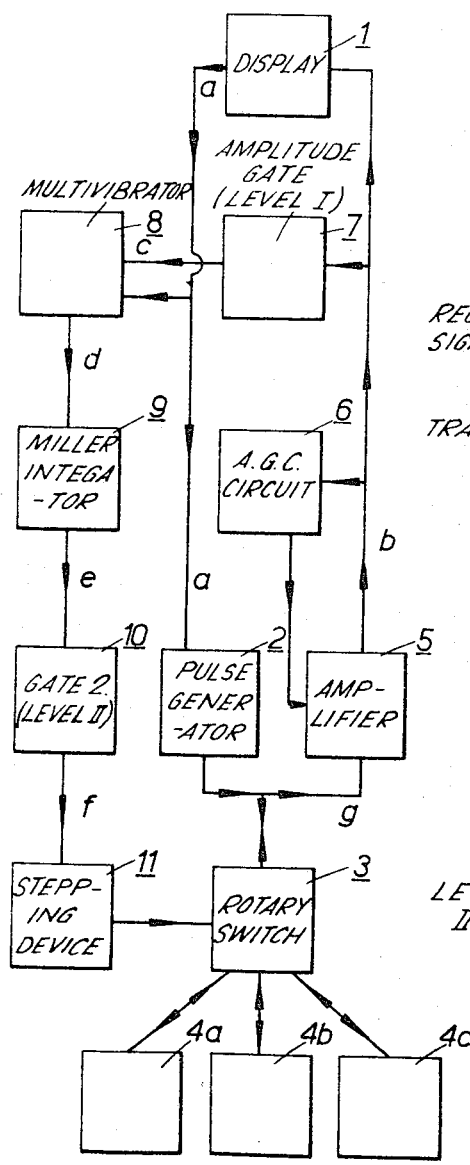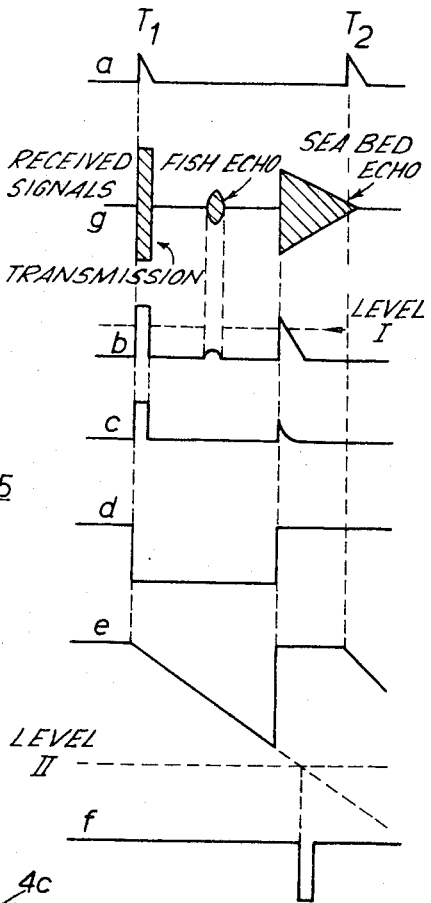

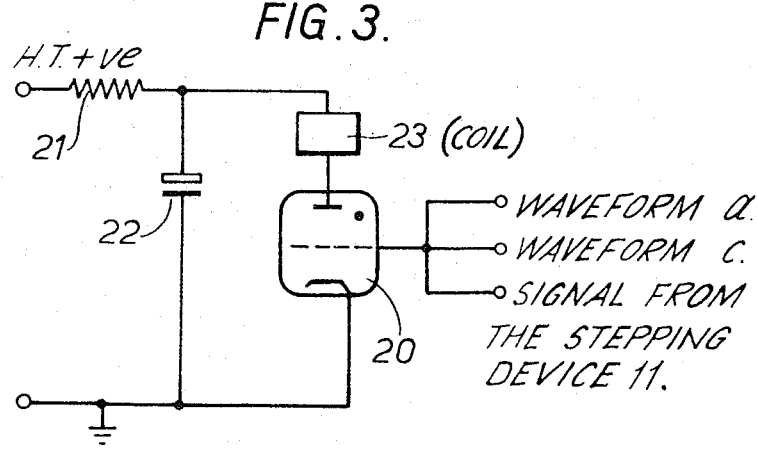

3,264,603
MARINE ECHO SOUNDING APPARATUS
Geoffrey Harold Ellis, Romford, and Roy William George Haslett, Ilford, England, assignors to S. Smith & Sons (England) Limited, London, England, a British company
Filed Dec. 17, 1963, Ser. No. 331,148
7 Claims. (Cl. 340—3)

The present invention relates to marine echo sounding apparatus, utilising the transmission and reception of pulses of acoustic energy (usually of utrasonic frequency) for the location of objects in relation to a vessel upon which the apparatus is mounted, such objects being for example the sea bed or fish. Particularly when using such apparatus for the location of fish, it is desirable to be able to obtain from the received echoes quantitative indications, that is to say, indications as to the size and the quantity of fish giving rise to the echoes (as well as indications as to their depth). Difficulties arise in attempting to obtain quantitative indications if variations occur in the coupling between the usual transducer (or transducers) by means of which pulses are emitted into or received from the surrounding water; and such variation in fact does occur, mainly by reason of aeration in the neighborhood of the transducer, under conditions of speed and weather which are such that fishing is possible and quantitative indications are therefore still required.

It is an object of the present invention to provide marine echo sounding apparatus with less susceptibility to variations in coupling between the transducer and the surrounding water than hitherto.

According to the present invention, marine echo sounding apparatus comprise a pulse generator adapted to generate electric pulses at predetermined time intervals, a plurality of similar transducer means, adapted to be located at a plurality of spaced locations on a vessel, each adapted both to emit a pulse of acoustic energy upon the application of an electric pulse thereto and to produce a pulse of electric energy upon the receipt of a pulse of acoustic energy thereby, an electric amplifier adapted to amplify electric pulses applied thereto, switching means having a plurality of operative conditions corresponding to the number of transducer means, the switching means serving to connect, in each said operative position, one transducer means to the pulse generator and to the electric amplifier, means to display output signals from the amplifier in relation to their time of receipt, and means responsive to the absence of electric output pulses at the amplifier output greater than a predetermined magnitude within a predetermined time after the production of a pulse by the pulse generator to operate the switching means to cause it to assume a different operative condition, successive operations of the switching means resulting in the sequential connection of the transducer means to the pulse generator and amplifier.

Preferably the predetermined magnitude is such that it is exceeded, and only exceeded, by the electric output pulses corresponding to the receipt of bottom echo signals when coupling of the transducer means to the surrounding water is such as to ensure satisfactory operation. It will thus be seen that if owing for example to aeration in the region of the transducer means there is inadequate coupling to the water, for the next cycle of echo sounder operation and the transformer means next in sequence will be utilized.

Preferably each transducer means comprise a single transducer, adapted both to emit and to respond to acoustic vibrations.

Preferably also means are provided to adjust the gain of the electric amplifier in response to the amplitude of signals received from a reference object to compensate for the effect of variations in coupling upon the signals produced by the transducer means.

The reference object may be the sea bed.

Alternatively and preferably the reference object may be a body located, in operation, at a fixed position in relation to the transducer means.

An embodiment of the invention will now be described with references to the accompanying drawings of which:

FIGURE 1 is a block diagram of the apparatus.

FIGURE 2 is a wave-form diagram, letters associated with the various wave-forms occurring at the corresponding parts in the diagram of FIGURE 1.

FIGURE 3 shows a circuit diagram of part of a slightly modified apparatus.

The apparatus shown has a conventional display unit, indicated by the block 1, having a pen which is repeatedly traversed at uniform speed across a strip of suitable recording paper, moved at a uniform speed in the direction of its length. At a datum point fixed in relation to each traverse of the pen, an electric contact is closed, to produce a trigger pulse, indicated by wave-form $a$.

The trigger pulse is fed to a conventional electric pulse generator indicated at 2, generating output pulses of ultrasonic frequency, and pulses generated by this generator are fed through a three-position rotary switch 3 to one or other of three transducers $4a$, $4b$ and $4c$, the particular transducer being dependent upon the position of the switch 3. The transducers $4a$, $4b$ and $4c$ are adapted to produce pulses of acoustic energy upon the application of suitable electric pulses thereto, and are also adapted to produce corresponding electric pulses upon reception of ultrasonic pulses. The transducers $4a$, $4b$ and $4c$ are distributed at appropriately spaced locations on the bottom of the ship, the locations being selected on the basis of experience so that the probability that all three transducers will be rendered inoperative by aeration simultaneously is reduced to a minimum. Pulses impinging on the transducers produce electric signals which are fed back through the rotary switch 3 to a conventional amplifier 5. The signals at the input of amplifier 5 thus consist of large signals corresponding to the transmitted pulses, approximately coincident in time with the pulses of wave-form $a$, followed by signals corresponding to the receipt of echoes from fish and from the sea bed (see wave-form $g$). These signals are amplified and rectified by amplifier 5, to produce signals as shown in wave-form $b$. The signals indicated by wave-form $b$ are applied to the pen of the pen recorder in the display unit 1, and are displayed on the chart in a known fashion.

The signals are also applied to an automatic gain control circuit indicated at 6 and are utilised, again in a known fashion, to control the gain of amplifier 5 to maintain the amplitude of signals received from some selected target at, as near as may be, a constant value. The signals in question may be the echo signals from the sea bed. However, alternatively and preferably there may be signals received from a target in the form for example of a sphere suspended at a predetermined position from the bottom of the vessel. In any case the automatic gain control preferably functions in a manner generally similar to that set out in the complete specification of British Patent No. 808,274.

The signals $b$ are also applied to an amplitude selector circuit 7, circuit 7 producing an output if and only if the input signals thereto exceed some predetermined level, indicated at I in relation to wave-form $b$.

The output from circuit 7 therefore consists of a wave-form as shown at $c$, that is to say of a pulse corresponding to the emission of the transmitted pulse and a further pulse corresponding to the reception of the sea bed echo. These output pulses are applied to one input of a multi-vibrator 8. The output from the display unit 1 (wave-form a) as applied to the other input of multi-vibrator 8 in such a fashion that a negative going pulse is initiated by wave-form a and normally terminated by the part of the wave-form c corresponding to the receipt of the sea bed echo. However, it should be noted that multi-vibrator 8 is so arranged that it will return to its quiescent state even in the absence of a sea bed echo pulse, prior to the occurrence of a further pulse in wave-form a, i.e., prior to the emission of a further transmitter pulse. Multi-vibrator 8 is a monostable with a period just shorter than the time interval between successive transmissions of pulses.

Multi-vibrator 8 thus provides at its output a waveform as shown at d, i.e., a square negative going waveform initiated substantially at the emission of the transmitter pulse and normally terminated upon receipt of the sea bed echo.

Wave-form d is applied to the input of a conventional Miller integrator circuit 9, which thus provides at its output a wave-form as indicated at e, that is to say a negative going ramp wave-form commencing at the beginning of the negative going edge of wave-form d.

Dave-form e is applied to the input of a further amplitude responsive circuit 10, this circuit producing an output in the form of a negative going pulse if and only if the input thereto falls below some level, indicated at II in relation to wave-form e. Thus the level II is such that it is not passed before the receipt of a sea bed echo in the expected depths of water, but it will be passed by wave-form e if no sea bed echo is received of a magnitude corresponding to satisfactory coupling of the transducer to the water.

Circuit 10 thus produces an output pulse as indicated by wave-form f if and only if no adequate sea bed echo pulse is received.

The output from circuit 10 is applied to a stepping device 11, arranged to actuate the rotary switch 3.

It will thus be seen that provided that bottom echoes of adequate amplitude are received within the time to be expected if the equipment is functioning satisfactorily, the rotary switch 3 will not be actuated. However, if no such bottom echo signal is received, indicating that the particular transducer connected through the rotary switch 3 to the pulse generator 2 and amplifier 5 is rendered inoperative by aeration, the next transducer in sequence will be switched in by operation of the switch 3 by device 11; and in all probability satisfactory signals will be obtained by use of this transducer.

In a modification the multivibrator 8 is replaced by the circuit shown in FIGURE 3. In this circuit a resistor 21 and a capacitor 22 are connected in series across the voltage supply. A coil 23 and a thyratron 20 are connected in series across capacitor 22. Coil 23 drives a two position rotary switch (not shown) which is connected to the Miller integrator 9. In the absence of any signal applied to the grid of thyratron 20, capacitor 22 charges up. Wave-form a is fed to the grid of thyratron 20 and fires the thyratron resulting in a current flowing through coil 23. Capacitor 22 rapidly discharges extinguishing thyratron 20 and begins to charge up again.

Wave-form c is fed to the grid of thyratron 20 and normally the sea bed echo signal causes a similar discharge of a pulse of current through coil 23. The two position rotary switch is moved from one position to the other by the pulses of current and its contacts are provided with potentials such that it produces the wave-form d. If the magnitude of the sea bed echo signal is below level I wave-form c does not fire thyratron 20 and wave-form e falls below level II. Wave-form f is then produced and operates the stepping device 11. Thyratron 20 is fed with a signal from stepping device 11 which ensures that it is always fired before the next transmission signal in wave-form a. The three signals fed to the grid of thyratron 20 are isolated from each other by resistors or cathode followers. It will be seen that this circuit is functionally identical to the multivibrator 8.

We claim:
1. Marine echo sounding apparatus comprising a pulse generator adapted to generate electric pulses at predetermined time intervals, a plurality of similar transducer means, adapted to be located at a plurality of spaced locations on a vessel, each adapted both to emit a pulse of acoustic energy upon the application of an electric pulse thereto and to produce a pulse of electric energy upon the receipt of a pulse of acoustic energy thereby, an electric amplifier adapted to amplify electric pulses applied thereto, switching means having a plurality of operative conditions corresponding to the number of transducer means, the switching means serving to connect, in each said operative position, one transducer means to the pulse generator and to the electric amplifier, means to display output signals from the amplifier in relation to their time of receipt, and means responsive to the absence of electric output pulses at the amplifier output greater than a predetermined magnitude within a predetermined time after the production of a pulse by the pulse generator to operate the switching means to cause it to assume a different operative condition, successive operations of the switching means resulting in the sequential connction of the transducer means to the pulse generator and amplifier.

2. Apparatus as claimed in claim 1 wherein the predetermined magnitude is such that it is exceeded and only exceeded, by electric output pulses corresponding to the receipt of bottom echo signals when coupling of the transducer means to the surrounding water is such as to ensure satisfactory operation.

3. Apparatus as claimed in claim 1 wherein the number of said transducer means is three.

4. Apparatus as claimed in claim 1 wherein each transducer means comprise a single transducer, adapted both to emit and to respond to acoustic vibrations.

5. Apparatus as claimed in claim 1 wherein means are provided to adjust the gain of the electric amplifier in response to the amplitude of signals received from a reference object to compensate for the effect of variations in coupling upon the signals produced by the transducer means.

6. Apparatus as claimed in claim 5 wherein the reference object is the sea bed.

7. Apparatus as claimed in clam 1 wherein the means responsive to the absence of electric output signals at the amplifier output greater than a predetermined magnitude within a predetermined time after the production of a pulse by the pulse generator comprise a ramp generator adapted to be triggered by pulses produced by the pulse generator to initiate a ramp signal, a first amplitude gate fed with the output signals at the amplifier output and adapted to pass only signals greater than the said predetermined magnitude, the signals passed by the first amplitude gate being fed to the ramp generator and adapted to end the ramp signal, and a second amplitude gate responsive to the ramp signal and adapted to pass signals greater than a further predetermined magnitude, the signals passed by the second amplitude gate being arranged to operate the switching means.

References Cited by the Examiner

UNITED STATES PATENTS 2,972,731  2/1961  Beebe _____ 340—3

CHESTER L. JUSTUS, *Primary Examiner.*

R. A. FARLEY, *Assistant Examiner.*